United States Patent
Hong

(10) Patent No.: US 6,836,311 B2
(45) Date of Patent: Dec. 28, 2004

(54) SEAL PATTERN FOR LIQUID CRYSTAL DISPLAY DEVICE INCLUDING FIRST, SECOND AND THIRD DUMMY SEAL PATTERNS IN NON-ACTIVE AREA

(75) Inventor: Sang-Pyo Hong, Gyoonggi-do (KR)

(73) Assignee: LG.Philips LCD Co., Ltd., Seoul (KR)

(*) Notice: Subject to any disclaimer, the term of this patent is extended or adjusted under 35 U.S.C. 154(b) by 0 days.

(21) Appl. No.: 10/409,571

(22) Filed: Apr. 9, 2003

(65) Prior Publication Data

US 2003/0218710 A1 Nov. 27, 2003

(30) Foreign Application Priority Data

May 23, 2002 (KR) .............................. 10-2002-0028718

(51) Int. Cl.[7] .............................................. G02F 1/1339
(52) U.S. Cl. ...................................... 349/153; 349/190
(58) Field of Search ............................... 349/153, 154, 349/187, 189, 190

(56) References Cited

U.S. PATENT DOCUMENTS 5,766,493 A    6/1998   Shin
5,835,176 A   11/1998   Jeong et al.
6,197,209 B1   3/2001   Shin et al.

FOREIGN PATENT DOCUMENTS

| JP | 2138459 | 5/1990 |
| JP | 3022390 | 1/1991 |
| JP | 4116619 | 4/1992 |
| JP | 5249422 | 9/1993 |
| JP | 5249423 | 9/1993 |
| JP | 7168172 | 7/1995 |

Primary Examiner—Tarifur R. Chowdhury
(74) Attorney, Agent, or Firm—McKenna Long & Aldridge LLP

(57) ABSTRACT

A seal pattern for a liquid crystal display device includes a substrate having an active area and a non-active area, a main seal pattern having an injection hole arranged in a boundary between the active and non-active areas, and first, second, and third dummy-seal patterns in the non-active area that are arranged along a same direction as a portion of the main seal pattern having the injection hole and spaced apart from each other. The first and second dummy-seal patterns have first and second openings corresponding to opposite ends of the injection hole. The third dummy-seal pattern has third, fourth, and fifth openings arranged alternately in correspondence with the first and second openings.

7 Claims, 10 Drawing Sheets

SEAL PATTERN FOR LIQUID CRYSTAL DISPLAY DEVICE INCLUDING FIRST, SECOND AND THIRD DUMMY SEAL PATTERNS IN NON-ACTIVE AREA

This application claims the benefit of Korean Patent Application No. 2002-28718, filed on May 23, 2002 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a seal pattern for a liquid crystal display device.

2. Discussion of the Related Art

Liquid crystal display (LCD) devices such as active matrix LCDs (AM LCDs) are widely used in devices such as notebook computers, desktop monitors, etc., due in part to their high resolution and their ability to display color and moving images. LCD devices generally include an upper substrate (i.e., an array substrate) coupled to, and spaced apart from, a lower substrate (i.e., a color filter substrate). A layer of liquid crystal material is typically disposed between the array and color filter substrates. Electrodes are provided on each of the upper and lower substrates such that electrodes of opposing substrates face each other. Anisotropic optical properties of the liquid crystal materials may be exploited by liquid crystal display devices to produce images. By varying the orientation of liquid crystal molecules in an electric field, the transmissivity of light within the layer of liquid crystal material may be selectively controlled. Liquid crystal display devices also include thin film transistors and pixel electrodes arranged in a matrix pattern.

Fabrication of LCD devices typically involves many processes including the formation of an array substrate, formation of a color filter substrate, and injection of liquid crystal material between the array and color filter substrates. Formation of array substrates includes forming switching elements and pixel electrodes. Formation of color filter substrates includes forming color filters and common electrodes.

FIG. 1 illustrates a cross-sectional view of a liquid crystal display panel used in a related art LCD device.

Referring to FIG. 1, an upper substrate 10 and a lower substrate 30 are coupled to, and spaced apart from each other. Liquid crystal material 50 is interposed between the upper and lower substrates 10 and 30. A gate electrode 32 is formed on a transparent substrate 1 included within the lower substrate 30 and a gate insulator 34 is formed on the gate electrode 32. A semiconductor layer 36, including an active layer 36a and an ohmic contact layer 36b, is formed on the gate insulator 34. A source electrode 38 and a drain electrode 40 are formed on the semiconductor layer 36. A channel region "ch", including an exposed portion of the active layer 36a, is formed between the source electrode 38 and the drain electrode 40. The gate electrode 32, the semiconductor layer 36, the source electrode 38, the drain electrode 40, and the channel "ch" constitute a thin film transistor "T". Though not shown in FIG. 1, a plurality of gate lines are connected to the gate electrode 32 and extend along a first direction. Further, a plurality of data lines are connected to the source electrode 38 and extend along a second direction, perpendicular to the first direction. Crossings of the gate and data lines define pixel regions "P". A passivation layer 42, including a drain contact hole 44 formed therein, is formed on the thin film transistor "T". A pixel electrode 48 is formed in the pixel region "P" and is connected to the drain electrode 40 via the drain contact hole 44. A cell area of the array substrate includes a connection portion for connecting to an external driving circuit. Accordingly, the cell area of the array substrate is wider than a corresponding cell area of the color filter substrate. A lower alignment layer 46 is formed on both the passivation layer 42 and the pixel electrode 48 in order to induce an alignment of the liquid crystal material 50. A color filter 14, for filtering light within a specific wavelength range, is formed beneath a transparent substrate 1 included within an upper substrate 30 at a position corresponding to the pixel electrode 48. A black matrix 12, for protecting light leakage and for preventing light from contacting the thin film transistor "T", is formed in boundary areas between each color portion of the color filter 14. A common electrode 16, serving as an electrode with which to apply voltage to the layer of liquid crystal material 50, is formed beneath the color filter 14 and the black matrix 12. An upper alignment layer 18, similar to the lower alignment layer 46, is formed beneath the common electrode 16. A cell gap between the upper and lower substrates 10 and 30 is sealed using a seal pattern 52. The seal pattern 52 is provided along the edges of the substrates to prevent leakage of liquid crystal material 50. Additionally, the seal pattern 52 maintains the upper and lower substrates 10 and 30 a predetermined distance from one another (e.g., maintains the cell gap between the upper and lower substrates 10 and 30, respectively) and enables liquid crystal, material to be injected.

As LCD manufacturing technologies progress, LCDs are finding new applications in lap-top computers, video cameras, aviation instrument panels, other electronic devices, etc., the manufacturable size of substrates in LCDs increase, and ways of fabricating LCDs to be thinner and lighter continue to be evaluated.

Typical glass substrates used in LCDs are about 0.7 mm thick. As the size of the substrate increases, however, the weight and thickness of the substrates must be reduced through chemical (e.g., with the use of etchant such as hydrofluoric acid) or physical (e.g., grinding, polishing, etc.) processes. Through these processes, minimum substrate thicknesses of about 0.5 mm to 0.6 mm are attainable upon consideration of factors such as substrate bending and external impacts encountered during a high speed revolution spin coating processes. Physical processes are often ineffective in maintaining optimal surface roughness and substrate thickness. Accordingly, chemical processes may be employed by dipping LCD substrates in, for example, a hydrofluoric acid solution.

The fabrication of liquid crystal cells includes forming an alignment layer to align liquid crystal molecules, forming a cell gap, cutting cells, injecting liquid crystal material, and sealing an injection hole arranged between the substrates.

FIG. 2 illustrates a flow chart of a process used in fabricating liquid crystal cells of ultra-thin liquid crystal display devices. A first process step (ST1) includes cleaning the array and color filter substrates by removing particles on the substrate prior to formation of the alignment layer on the substrate. A second process step (ST2) includes forming the alignment layer by forming thin polymer film on the substrate, hardening, and rubbing the thin polymer film. A third process step (ST3) includes forming a seal pattern and a spacer. The seal pattern forms a cell gap allowing the injection of liquid crystal material between the substrates and preventing the injected liquid crystal material from leaking. In ultra-thin liquid crystal display devices, the seal pattern also includes a dummy-seal pattern for preventing etchants from infiltrating into the cell gap during any of the aforementioned processes. The seal pattern is fabricated using screen-printing technology, thermosetting resin, and glass fiber. The spacer is usually formed on the array substrate and uniformly maintains the gap between the two substrates. The seal pattern is typically formed on the color filter substrate to minimize error in attaching the upper and lower substrates. A fourth process step (ST4) includes aligning and attaching the upper and lower substrates to each other. The degree to which the upper and lower substrates may be aligned is determined by a measuring an alignment margin, usually less than a few microns, provided when the substrates are initially designed. If the upper and lower substrates are aligned and attached with an alignment margin larger than a predetermined error margin, the display quality of the liquid crystal display device may be deteriorated due to light leakage during operation of the liquid crystal cell. After the seal pattern is formed on one of the upper or lower substrates, the substrates undergo a pre-heating process and are attached together in a temporary fixing process. Subsequently, the substrates are permanently attached together using a hardening process (e.g., a thermo-compression bonding process). A fifth process step (ST5) includes cutting the attached substrates into a unit cell. A single glass substrate typically includes a plurality of smaller array or color filter substrates in cell areas that need to be separated. A sixth process step (ST6) includes injecting liquid crystal material into the unit cells. Since each cell has a cell gap of only a few micrometers per hundreds of square centimeters in substrate area, a vacuum injection method, inducing a capillary phenomenon within the cell gap, is typically used in injecting liquid crystal material into the cell. After the liquid crystal material is injected to the cell, an injection hole through which the liquid crystal material was injected, is sealed. A seventh process step (ST7) includes forming an ultra-thin substrate by etching the exterior surfaces of the attached substrates. As will be described in greater detail below, this etching process includes a cleaning step, an etching step, and a drying step. Upon completion of the aforementioned processing steps, the liquid crystal display panels are inspected. Subsequently, a polarization film is formed on an outer surface of each of the substrates and a driving circuit is connected to the substrates.

FIG. 3 illustrates a flow chart of an etching process for forming ultra-thin substrates described in step ST7 of FIG. 2.

Referring to FIG. 3, a first processing step (STI) including removing contaminants from the exterior surfaces of the attached substrates is performed before they are etched within an etching apparatus. Contaminants found on the outer surfaces of the attached substrates can cause etching errors and prevent uniform etching of the substrates. Etching errors and non-uniform etching result in a degradation in the quality of images displayable by the liquid crystal display device by diffusing reflections and refractions at the surface of the attached substrates. Contaminants include organic films or minute particles and may be removed using cleaning solutions such as IPA (isopropyl alcohol) or DI water (deionized water). After contaminants are removed, the cleaned substrates are arranged within an etching apparatus containing an etchant such as a hydrofluoric acid (HF) solution and are etched for a predetermined amount of time in a second processing step (STII). Subsequently, in third processing step (STIII), any etchant remaining on the substrates is removed. Finally, in fourth processing step (STIV), the cleaned substrates are dried.

FIG. 4 illustrates a plan view of a seal pattern used in typical ultra-thin liquid crystal display devices.

Referring to FIG. 4, a glass substrate may, for example, include two liquid crystal cells. The seal pattern of the ultra-thin type liquid crystal display device includes a main seal pattern 60a, in which the injection hole 61 is provided, and a dummy-seal pattern 60b surrounding the main seal pattern 60a. The dummy-seal pattern 60b does not contain any openings and thereby prevents etchant or cleaning solution from penetrating into the main seal pattern 60a.

FIG. 5 illustrates a cross-sectional view along a line V—V shown in FIG. 4.

Referring to FIG. 5, air between the main seal pattern 60a and the dummy-seal pattern 60b is introduced when a substrate 68 is attached. Because the dummy-seal pattern 60b does not include an opening, air becomes trapped between the substrates and the seal patterns and may cause serious problems. The air trapped between the main seal pattern 60a and the dummy-seal pattern 60b may induce a rupture 64 in the main seal pattern 60a and produce air bubbles 66 in the dummy-seal pattern 60b.

In order to solve the foregoing problems, Applicants of the present invention have disclosed in U.S. patent application Ser. No. 09/737,766, filed Aug. 9, 2001, a seal pattern structure for the ultra-thin liquid crystal display devices. FIG. 6A illustrates a plan view of the seal pattern structure of the ultra-thin liquid crystal display device disclosed in the aforementioned application. A plurality of seal patterns 82 is formed on the substrate 70 of the liquid crystal cell 72.

Referring to FIG. 6A, the seal pattern 82 includes a main seal pattern 74 having an injection hole 73, a first dummy-seal pattern 76 surrounding the main seal pattern 74 and a second dummy-seal pattern 78 surrounding the first dummy-seal pattern 76 and maintained a predetermined distance from an edge of the substrate 70. The first and second dummy-seal patterns 76 and 78, respectively, include at least one opening, VIa. A third dummy-seal pattern 80 is formed between the first and second dummy-seal patterns 76 and 78, respectively, adjacent to at least one opening VIa of the second dummy-seal pattern 78.

FIG. 6B illustrates a magnified view of area "VIb" shown in FIG. 6A including an exhaust path taken by air during the thermo-compression bonding process.

Referring to FIG. 6B, when the air is exhausted from the liquid crystal cell 72 during the thermo-compression bonding process, a bottleneck phenomenon occurs and a high air pressure is concentrated at the injection hole 73. However, the exhaust path defined by the seal pattern shown in FIG. 6B is also long and tortuous. Accordingly, the exhaust path shown in FIG. 6B is inefficient in facilitating the transport of air and contributes to the generation of highly pressurized air at injection hole 73. The high air pressure weakens the adhesive strength of the sealant at the injection hole 73 and increases the likelihood of cell gap errors. Furthermore, alignment spots, capable of preventing certain pre-tilt angles from being imparted to the liquid crystal material, may be generated in a portion of the alignment layers located near the injection hole 73 as a result of the high air pressure.

SUMMARY OF THE INVENTION

Accordingly, the present invention is directed to a seal pattern structure of an ultra-thin liquid crystal display device that substantially obviates one or more of problems due to limitations and disadvantages of the related art.

An advantage of the present invention provides a seal pattern structure for a liquid crystal display device (e.g., an ultra-thin LCD device) allowing air introduced during an attaching process to be efficiently exhausted from a liquid crystal cell while preventing etchant from penetrating into the liquid crystal cell.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a seal pattern for a liquid crystal display device comprises a substrate having an active area and a non-active area, a main seal pattern having an injection hole arranged in a boundary between the active and non-active areas, and first, second, and third dummy-seal patterns in the non-active area arranged along substantially the same direction as a portion of the main seal pattern having the injection hole, wherein the first, second, and third dummy-seal patterns are spaced apart from each other, wherein the first and second dummy-seal patterns include first and second openings corresponding to ends of the injection hole, and wherein the third dummy-seal pattern includes third, fourth, and fifth openings alternately arranged at ends of the first and second openings.

In one aspect of the present invention, the injection hole of the main seal pattern may include a plurality of injection hole dams that are spaced apart from each other.

In another aspect of the present invention, the substrate includes an ultra-thin glass substrate as a base substrate.

In yet another aspect of the present invention, the third dummy-seal pattern further includes portions that extend substantially perpendicularly from opposite ends of the third dummy-seal pattern such that they are adjacent to and spaced apart from the main seal pattern and spaced apart from the first and second dummy-seal patterns.

In still another aspect of the present invention, the first and second dummy-seal patterns may further include a linear seal pattern between the first and second openings, wherein a centerline of the linear seal pattern is substantially aligned with a centerline of the injection hole.

In another aspect of the present invention, a sum of widths of the first and second openings is substantially equal to a sum of widths of the third, fourth, and fifth openings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the present invention, examples of which are illustrated in the accompanying drawings.

Figure 7:
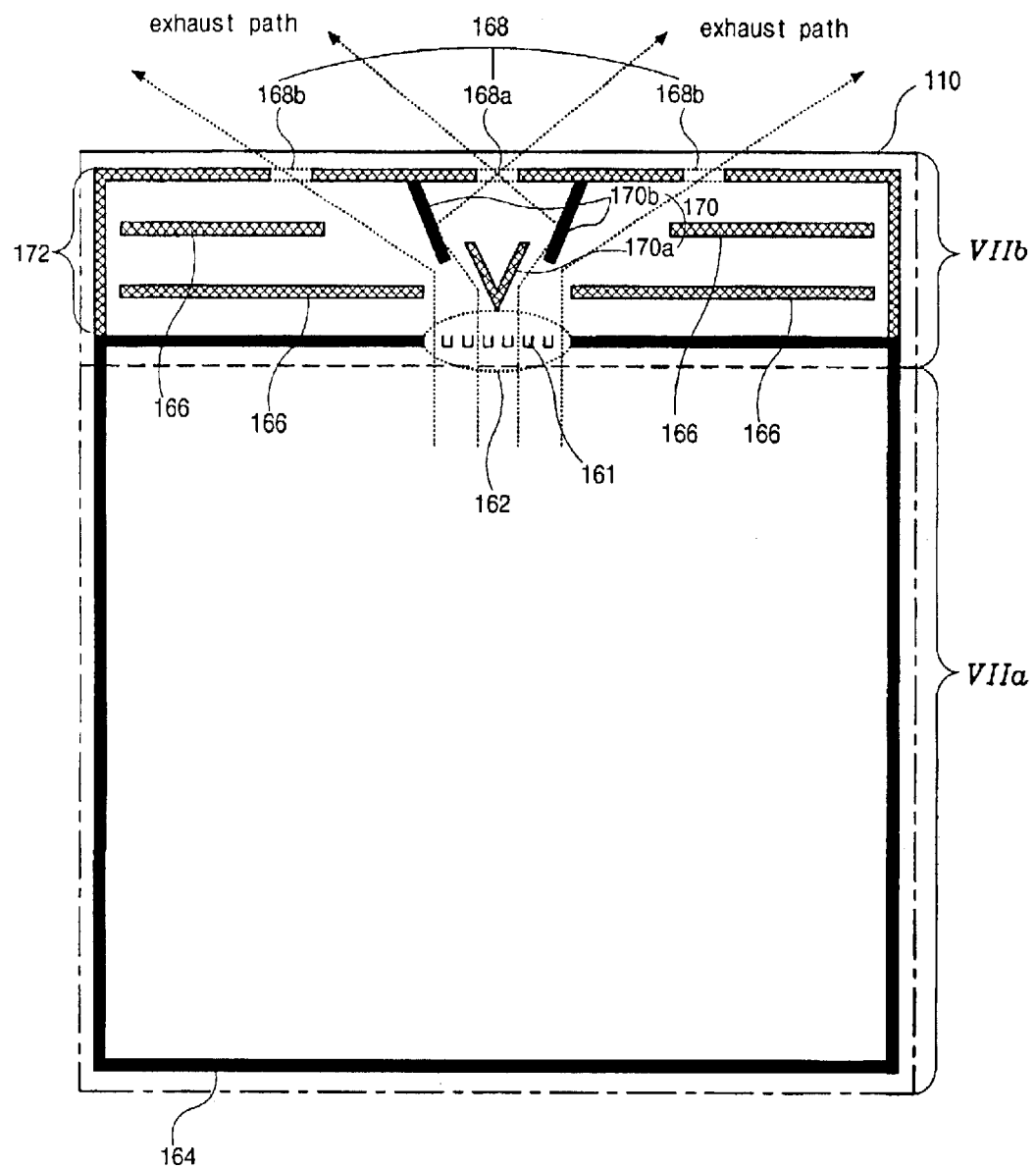
FIG. 7 illustrates a plan view of a seal pattern for a liquid crystal cell according to a first embodiment of the present invention.

FIG. 7 illustrates a plan view of a seal pattern structure for a liquid crystal cell (e.g., an ultra-thin liquid crystal cell) according to a first embodiment of the present invention.

Figure 1:
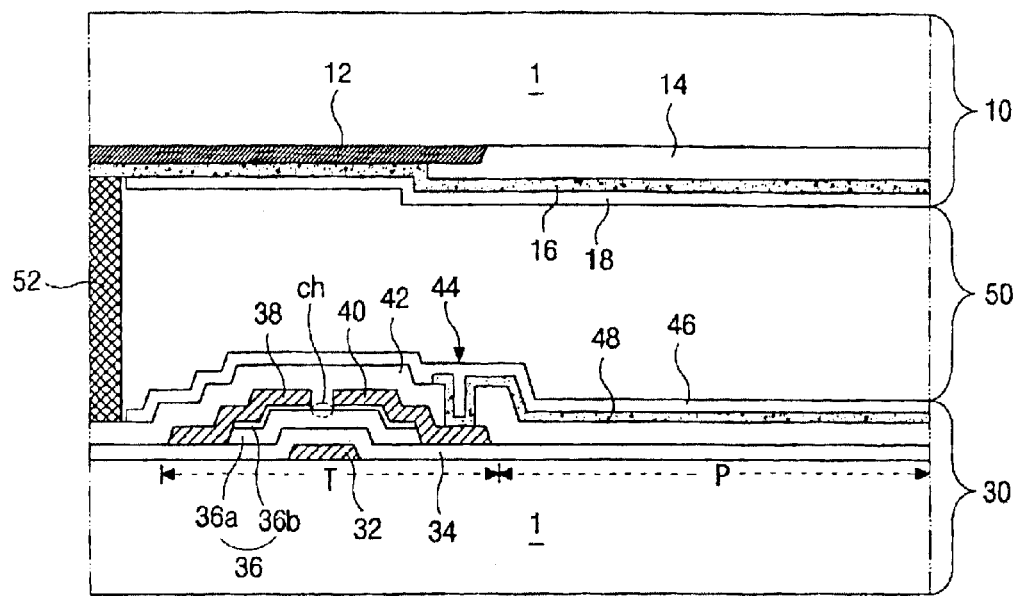
FIG. 1 illustrates a schematic cross-sectional view of a liquid crystal display panel used in a liquid crystal display device.
Figure 2:
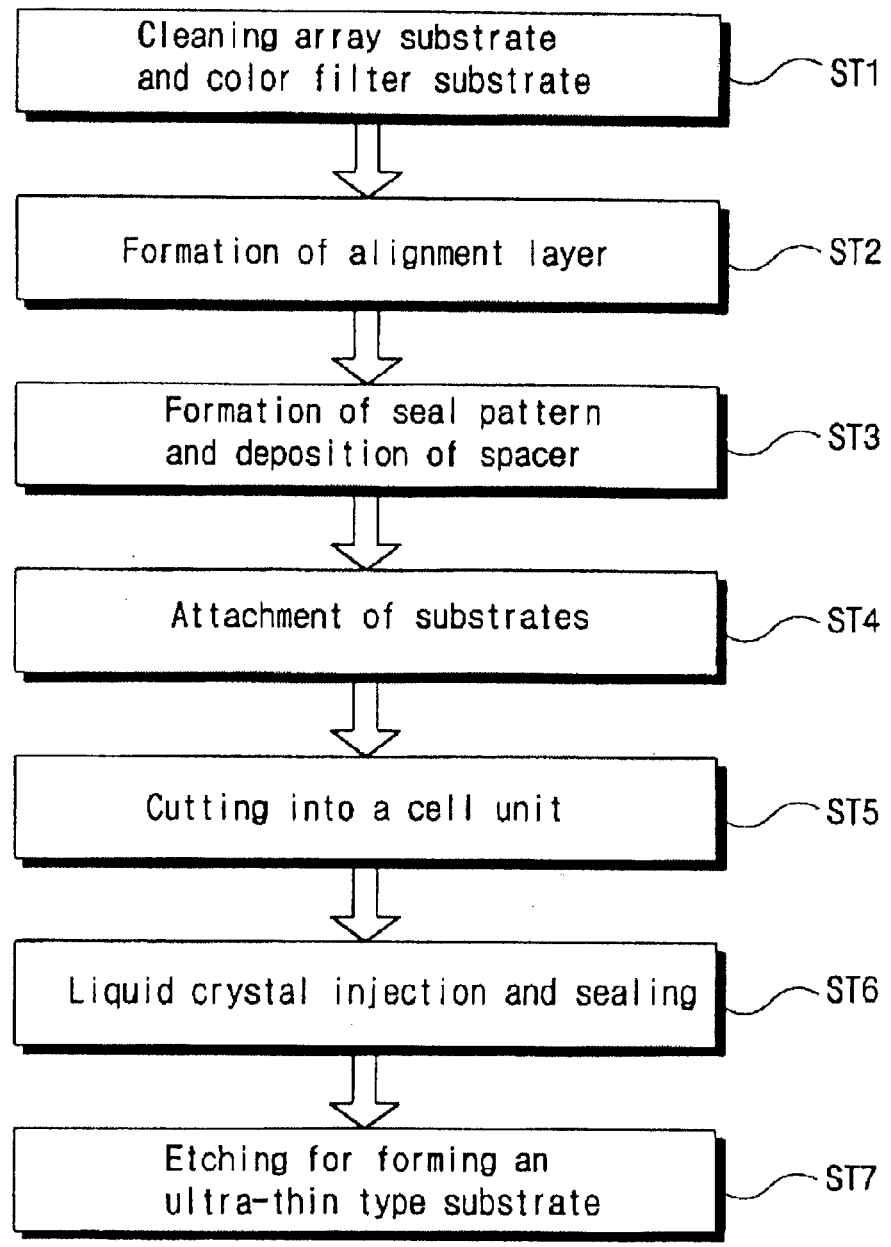
FIG. 2 illustrates a flow chart of a process used in fabricating an ultra-thin liquid crystal display device.
Figure 3:
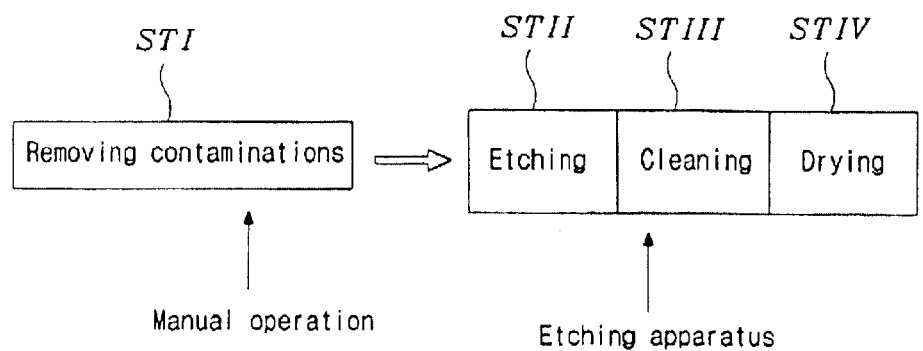
FIG. 3 illustrates a flow chart of a process corresponding to step ST7 as shown in FIG. 2.
Figure 4:
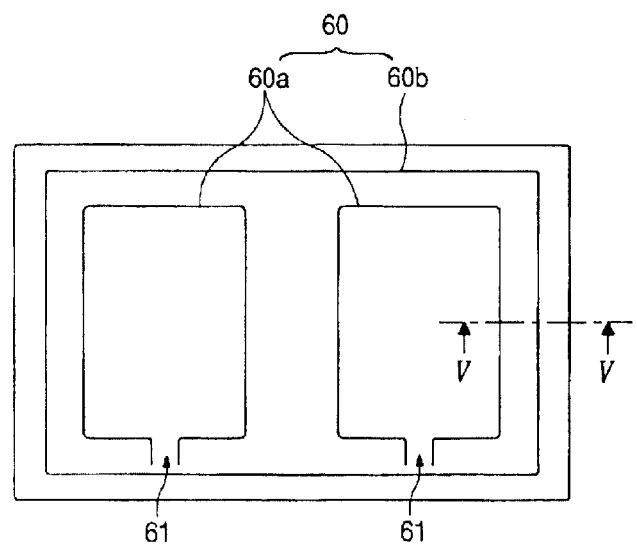
FIG. 4 illustrates a plan view of a seal pattern for use in ultra-thin liquid crystal display devices.
Figure 5:
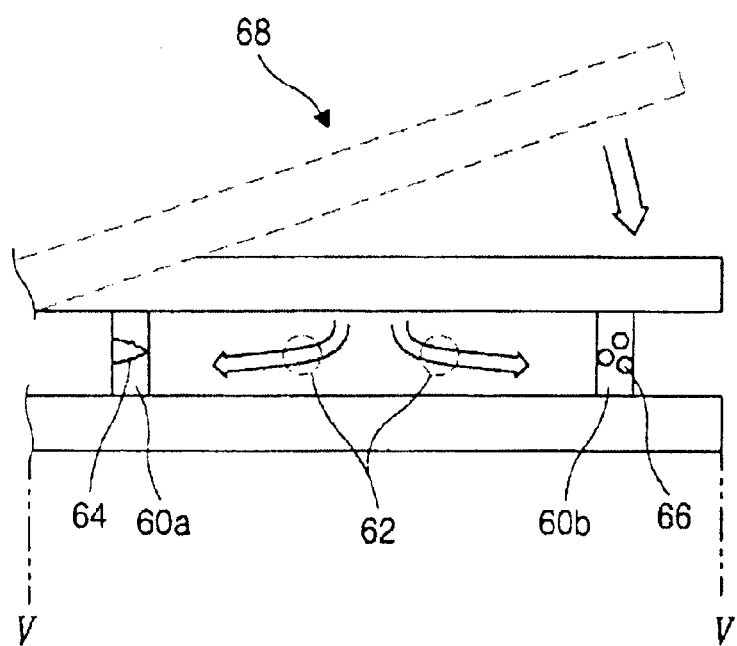
FIG. 5 illustrates a cross-sectional view taken along a line V—V as shown in FIG. 4.
Figure 6A:
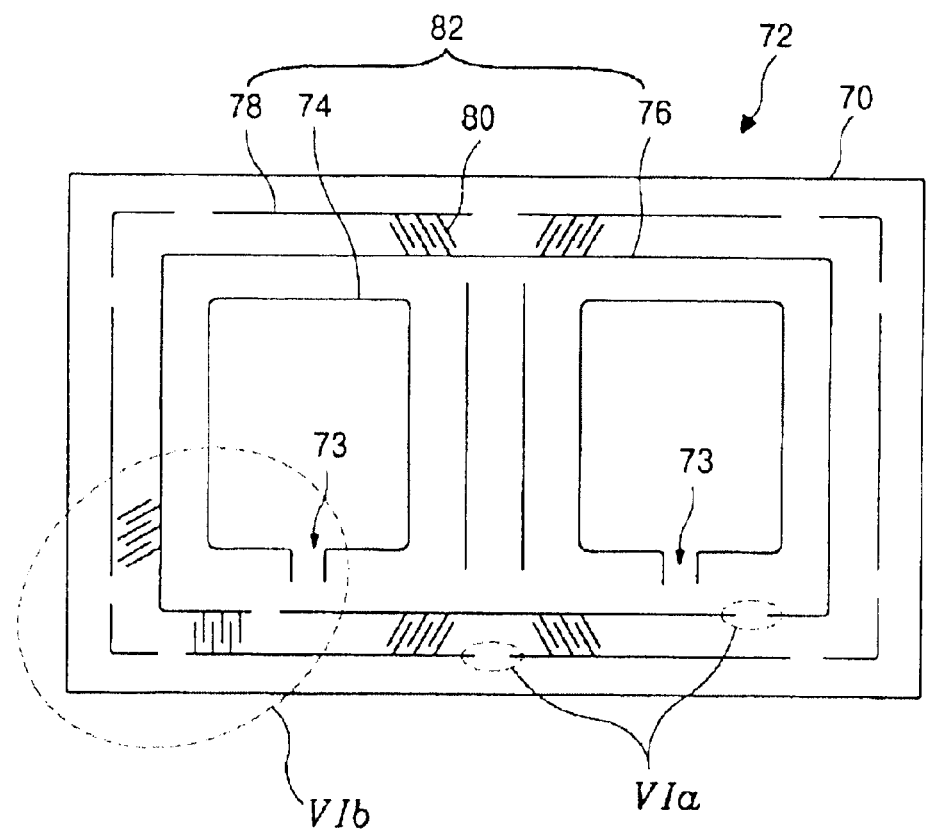
FIG. 6A illustrates a plan view of a seal pattern structure of an ultra-thin liquid crystal display device.
Figure 6B:
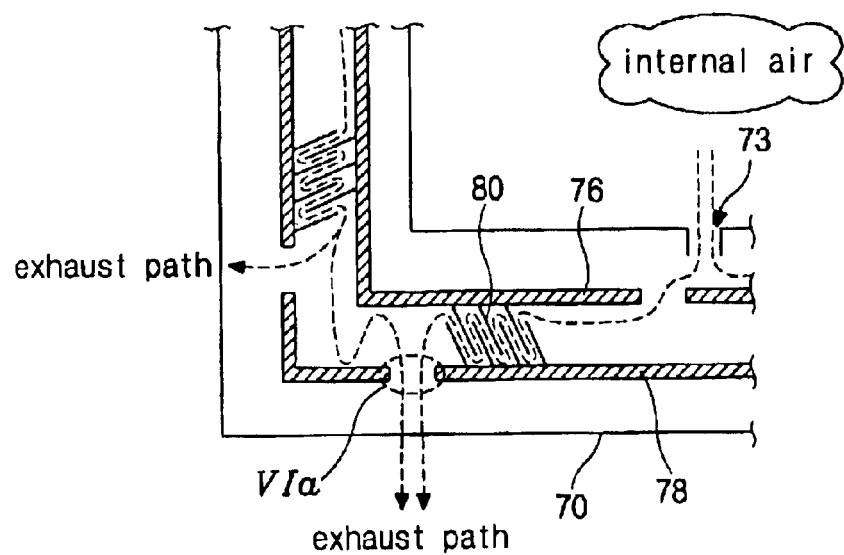
FIG. 6B illustrates an expanded view of area "VIb" as shown in FIG. 6A.

Referring to FIG. 7, the seal pattern may, for example, be formed on an attached substrate fabricated, for example, according to the processes outlined in FIG. 2. The attached substrate 110 may, for example, include an active area VIIa and a non-active area VIIb. In one aspect of the present invention, at least a portion of main seal pattern 164 may be arranged in a boundary region between the active area VIIa and the non-active area VIIb. In another aspect of the present invention, the main seal pattern 164 may include an injection hole 162. A plurality of injection hole dams 161 may be formed proximate the injection hole 162 to maintain uniformity of a cell gap at portions of a liquid crystal display panel where the main seal pattern 164 is not formed. The injection hole dams 161 may further prevent injected liquid crystal material from being exposed by the atmosphere. In one aspect of the present invention the injection hole dams 161 may be arranged within the injection hole 162 and be substantially symmetric about the centerline of the injection hole 162. In one aspect of the present invention, the plurality of injection hole dams 161 may be formed such that they are spaced apart from each other.

According to the principles of the present invention, a dummy-seal pattern 172 may be formed in the non-active area VIIb, opposite the injection hole 162. The dummy-seal pattern 172 may have substantially the same width as the main seal pattern 164 and also be formed to substantially enclose the non-active area VIIb. A plurality of exhaust holes 168 may be formed in an outer portion of the dummy-seal pattern 172.

A first dummy-seal pattern 170 may, for example, be formed within the dummy-seal pattern 172 and opposite the injection hole 162. A second dummy-seal pattern 166 may, for example, be formed within the dummy-seal pattern 172 and at opposite sides of the first dummy-seal pattern 170. In one aspect of the present invention, the first and second dummy-seal patterns, 170 and 166, respectively, may support the substrates of the liquid crystal cell.

Referring still to FIG. 7, the dummy-seal pattern 172 may include a first exhaust hole 168a, arranged in a position corresponding to the injection hole 162, and at least two second exhaust holes 168b spaced apart from the first exhaust hole 168a by a predetermined distance. The first dummy-seal pattern 170 may include a first pattern 170a, which is substantially V-shaped. In one aspect of the present invention, the first pattern 170a may be substantially symmetric with respect to the centerline of the injection hole 162. The first dummy-seal pattern 170 may further include a second pattern 170b that may also be substantially symmetric with respect to the centerline of the injection hole 162. In one aspect of the present invention, the first dummy-seal pattern 170 may be substantially symmetric about the centerline of the first exhaust hole 168a.

Dotted arrow lines illustrate the internal exhaust path of air exiting the liquid crystal display panel. The second dummy-seal pattern 166 may be formed within the dummy-seal pattern 172 and include at least two groups of at least two members provided outside a region found between the injection hole 162 and each of the at least two second exhaust holes 168b. Formed in such a manner, the second dummy-seal pattern 166 may facilitate the transport of air between the injection hole 162 and the at least two second exhaust holes 168b out of the liquid crystal display panel. Accordingly, members of the at least two groups included within the second dummy-seal pattern 166 that are closest to predetermined corresponding ones of the at least two second exhaust holes 168b may be formed so as to be shorter than members of the at least two groups included within the second dummy-seal pattern 166 that are farthest away from the predetermined corresponding one of the at least two second exhaust holes 168b. Since no portions of the first or second dummy-seal patterns 170 or 166, respectively, exist between the injection hole 162 and the exhaust hole 168, an unobstructed exhaust path may be provided to air being exhausted from within the liquid crystal display panel. Furthermore, generation of the deleterious alignment spots may be avoided using the seal pattern structure of the present invention.

Generally, seal patterns are formed using screen-printing or dispensing methods. Screen-printing methods, however, are generally favored over dispensing methods to form seal patterns because screen-printing methods may be used to form minute and uniform seal patterns. Using screen-printing methods, however, to form the aforementioned seal pattern structure (i.e., the V-shaped seal pattern substantially aligned with the centerline of the injection hole 162), pattern defects (e.g., seal spattering) may be generated.

Figure 8:
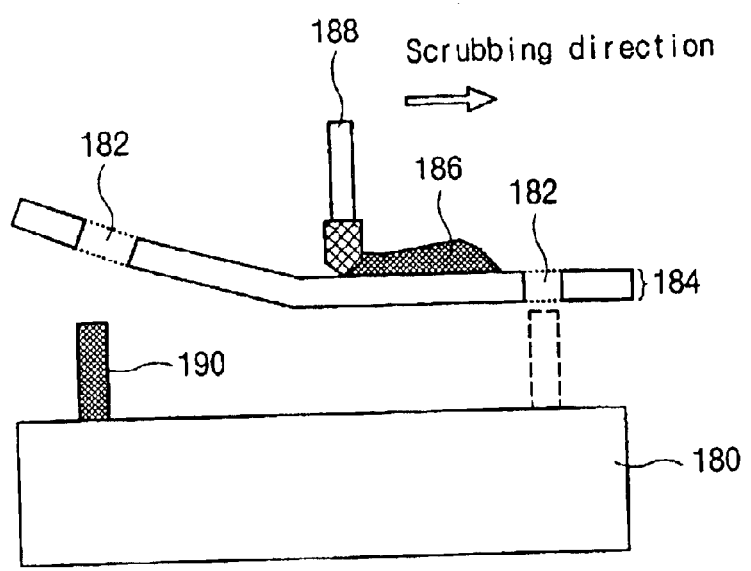
FIG. 8 illustrates a process of fabricating a seal pattern using screen-printing technology.

FIG. 8 illustrates a fabricating process of a seal pattern using a screen-printing technology.

Referring to FIG. 8, a screen 184 having a plurality of openings 182 is positioned on a substrate 180 and sealant material 186 is coated onto the screen 184. When, for example, a squeegee 188 scrubs the sealant material 186 along a specific direction, the desired seal pattern 190 is formed through the openings 182 of the screen 184. Though not shown in FIG. 8, a pattern of the openings 182 of the screen 184 corresponds to the desired seal pattern 190. If, however, the desired seal pattern comprises the V-shaped dummy-seal pattern shown in FIG. 7, the scrubbing of the squeegee 188 on the screen 184 causes a local distortion (e.g., an irregular wrinkle) on the screen 184. Accordingly, seal spattering may occur while the sealant material 186 is printed onto the substrate 180. For example, sealant material 186 may be spattered onto the active area and an image displaying quality of the liquid crystal display (LCD) device may be deteriorated.

Figure 9:
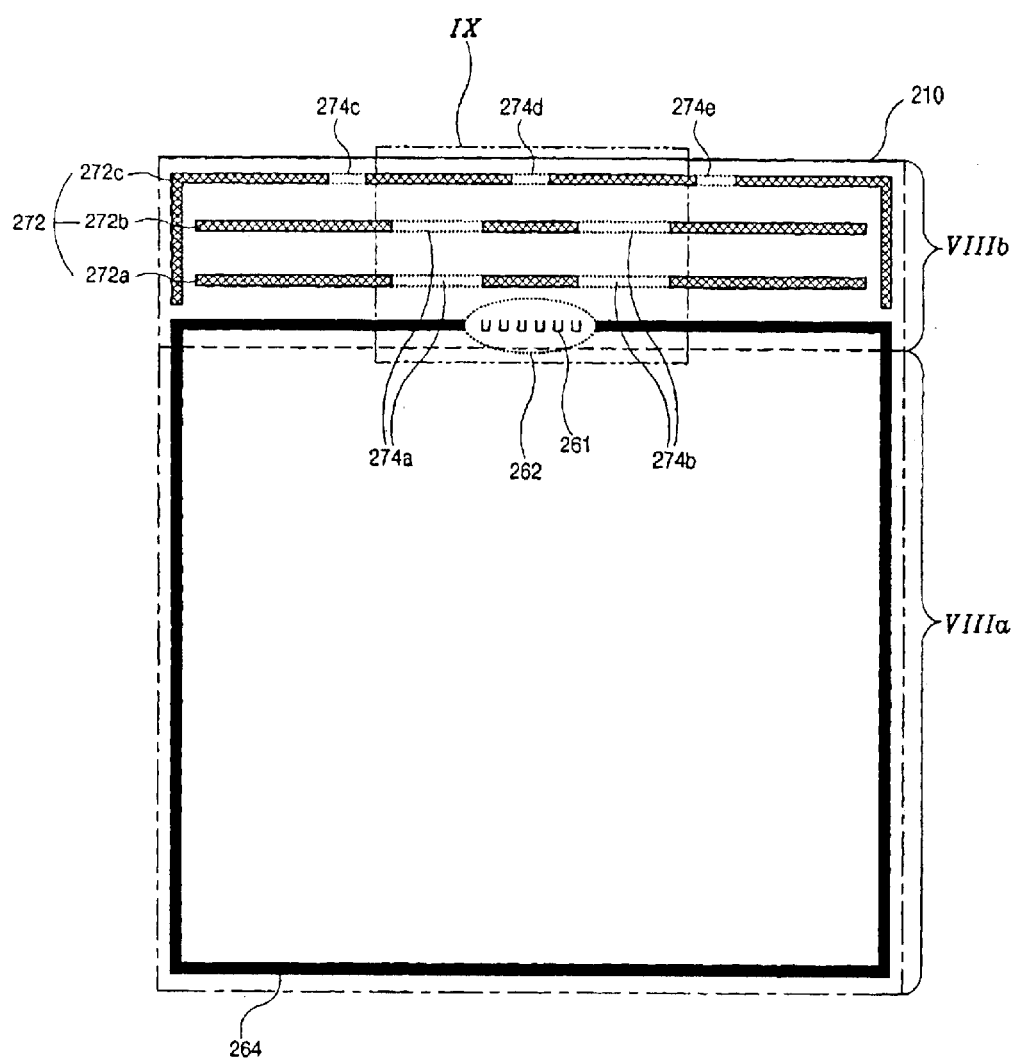
FIG. 9 illustrates a plan view of a seal pattern for a liquid crystal cell according to a second embodiment of the present invention.

FIG. 9 illustrates a plan view of a seal pattern for a liquid crystal cell according to a second embodiment of the present invention.

Referring to FIG. 9, a substrate 210 may include an active area VIIIa, a non-active area VIIIb, and a portion of a main seal pattern 264 arranged in a boundary region of the active area VIIIa. An ultra-thin glass substrate may be used as a base substrate for the substrate 210. A predetermined side of the main seal pattern 264 may, for example, include an injection hole 262. In one aspect of the present invention, a plurality of injection hole dams 261 may be formed proximate the injection hole 262 (e.g., within the injection hole 262). In another aspect of the present invention, the plurality injection hole dams 261 may be spaced apart from each other such that they are substantially symmetric about the centerline of the injection hole 262.

In one aspect of the present invention, a dummy-seal pattern 272 may be formed in the non-active area VIIIb, opposite the injection hole 262. The dummy-seal pattern 272 may, for example, include first, second, and third dummy-seal patterns 272a, 272b, and 272c, respectively. In one aspect of the present invention, the first, second, and third dummy seal patterns 272a, 272b, and 272c may be arranged substantially parallel to, and laterally spaced apart from, each other. In another aspect of the present invention, each of the first, second, and third dummy-seal patterns 272a, 272b, and 272c may be formed substantially parallel to the predetermined side of the main seal pattern 264 in which the injection hole 262 is formed. Further, the first, second, and third dummy seal patterns 272a, 272b, and 272c may prevent seal spattering during a seal pattern printing process.

The first and second dummy-seal patterns 272a and 272b may include first and second openings 274a and 274b, respectively. The first and second openings 274a and 274b may be spaced apart from each other such that portions of the first and second dummy-seal pattern 272a and 272b arranged between the first and second openings 274a and 274b are substantially symmetric about the centerline of the injection hole 262. In one aspect of the present invention, the arrangement of the first and second openings 274a and 274b corresponds to opposite sides of the injection hole 262.

The third dummy-seal pattern 272c may, for example, include third, fourth, and fifth openings 274c, 274d, and 274e, respectively. In one aspect of the present invention, the third, fourth, and fifth openings 274c, 274d, and 274e may be arranged within the third dummy-seal pattern 272c so as to prevent an influx of exterior air and hydrofluoric acid (HF) into the liquid crystal cell. In another aspect of the present invention, the third, fourth, and fifth openings 274c, 274d and 274e may be arranged at positions corresponding to opposing ends of each of the first and second openings 274a and 274b such that the first and second openings 274a and 274b do not coincide with the third, fourth, and fifth openings 274c, 274d, and 274e.

According to the principles of the present invention, the third dummy-seal pattern 272c may further include extended portions that are substantially perpendicular to the predetermined side of the main seal 264 and that extend from opposing ends of the third dummy-seal pattern 272c. In one aspect of the present invention, the extended portions may be spaced apart from the first and second dummy-seal patterns 272a and 272b. In another aspect of the present invention, the extended portions may be spaced apart from the main seal pattern 264.

Figure 10:
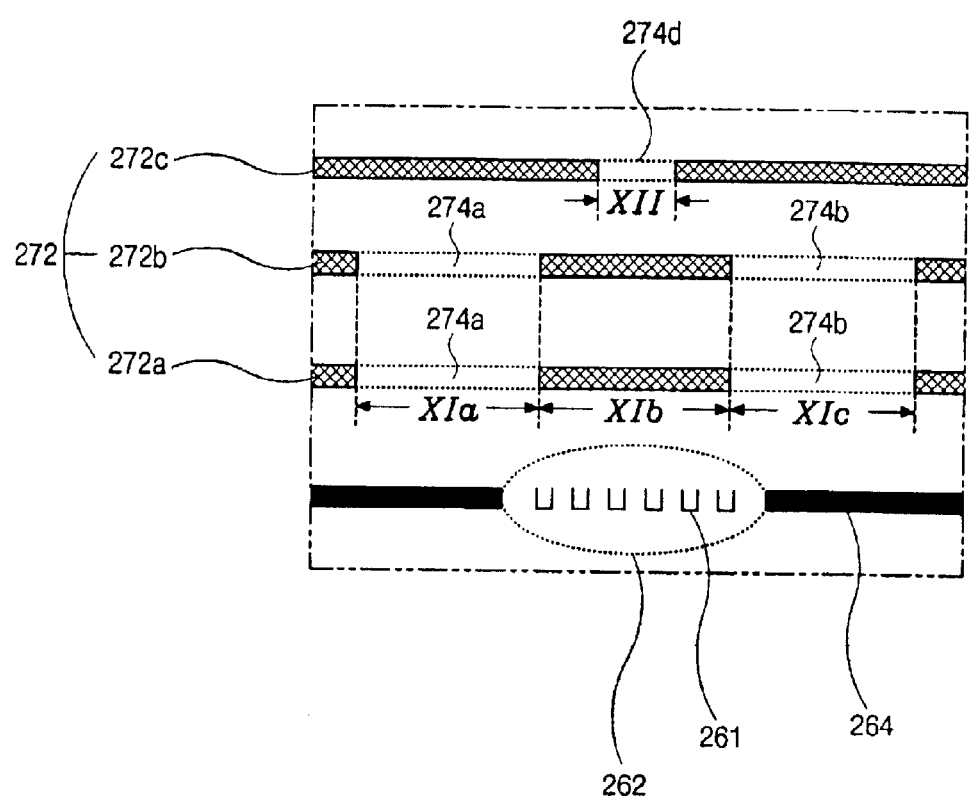
FIG. 10 illustrates an expanded view of area "IX" as shown in FIG. 9.

FIG. 10 illustrates an expended view of area "IX" as shown in FIG. 9.

Referring to FIG. 10, According to the principles of the present invention, the relative widths and arrangement of openings within the dummy seal pattern 272 may be chosen such that the smooth exhaustion of air out of the liquid crystal cell is facilitated while exterior air and hydrofluoric acid (HF) are substantially prevented from entering into the liquid crystal cell. For example, when a width "XIb" of portions of the first and second dummy-seal patterns 272*a* and 272*b* arranged between the first and second openings 274*a* and 274*b* is, for example, about 25 µm, and when widths "XIa" and "XIc" of the first and second openings 274*a* and 274*b*, respectively, are each about 6 µm, a width "XII" of the fourth opening 274*d* is about 4 µm. Though not shown in FIG. 10, the widths of third and fifth openings 274*c* and 274*e* are substantially equal to the width "XII" of the fourth opening 274*d* such that the sum of widths of the first and second openings 274*a* and 274*b* is substantially equal to the sum of widths of the third, fourth and fifth openings 274*c*, 274*d* and 274*e*. In one aspect of the present invention, the centerline of the fourth opening 274*d* may substantially aligned with the centerline of portions of the first and second dummy-seal patterns 272*a* and 272*b* arranged between the first and second openings 274*a* and 274*b*.

According to the principles of the present invention, the seal pattern structure may be applied to general liquid crystal display devices, including ultra-thin liquid crystal display (LCD) devices. The seal pattern structure of the present invention is capable of preventing exterior air from infiltrating a liquid crystal cell while air within the liquid crystal cell is being exhausted when substrates are attached and the seal pattern is hardened. Further, the seal pattern structure substantially prevents the infiltration of hydrofluoric acid (HF) into the liquid crystal cell during an etching process used in forming an ultra-thin substrate. In one aspect of the present invention, the etching process forming the ultra-thin substrate may be performed after a substrate attachment process. In another aspect of the present invention, a thickness of the attached substrates is between about 0.2 mm and about 0.9 mm after the etching process is performed. In another aspect of the present invention, fabrication of an ultra-thin liquid crystal display (LCD) device may be completed by injecting liquid crystal material into a liquid crystal cell formed during a cell-cutting process wherein substrates having a plurality of liquid crystal cells are cut into individual liquid crystal cells.

Use of the aforementioned seal pattern structure may be advantageous for at least the following reasons. First, the seal pattern structure of the present invention substantially prevents the seal spattering phenomenon and thus provides a stable seal pattern structure. Second, the seal pattern structure of the present invention substantially prevents infiltration of hydrofluoric acid (HF) into the liquid crystal cell during etching processes capable of reducing a thickness of a substrate (e.g., etching processes capable of forming ultra-thin substrates). Therefore, the seal pattern structure of the present invention increases the reliability of the products. Third, the seal pattern structure of the present invention is less complex than seal patterns of the related art. Therefore, LCD fabricating efficiency may be increased. Fourth, the seal pattern structure of the present invention may be applied to the fabrication of many types of liquid crystal display devices including, for example, ultra-thin type liquid crystal display (LCD) devices.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A seal pattern for a liquid crystal display device, comprising:

a substrate including an active area and a non-active area;

a main seal pattern arranged in a boundary region between the active and non-active areas, wherein a predetermined side of the main seal pattern includes an injection hole, wherein the injection hole comprises opposing ends; and first, second, and third dummy-seal patterns arranged in the non-active area, wherein the first, second, and third dummy-seal patterns are arranged substantially parallel to the predetermined side of the main seal pattern, wherein the first, second, and third dummy-seal patterns are spaced apart from each other, wherein the first and second dummy-seal patterns include first openings and second openings at positions corresponding to the opposing ends of the injection hole, wherein each of the first and second openings comprise opposing ends, and wherein the third dummy-seal pattern includes third, fourth, and fifth openings arranged at positions corresponding to the opposing ends of the first and second openings.

2. The seal pattern according to claim 1, wherein the substrate comprises an ultra-thin glass substrate as a base substrate.

3. The seal pattern according to claim 1, wherein the third dummy-seal pattern further includes extended portions, wherein the extended portions are substantially perpendicular to the predetermined side of the main seal pattern, and wherein the extended portions extend from opposing ends of the third dummy-seal pattern, are adjacent to the main seal pattern, and are spaced apart from the first and second dummy-seal patterns.

4. The seal pattern according to claim 1, wherein the first and second dummy-seal patterns further include a linear seal pattern arranged between the first and second openings, wherein the linear seal pattern is substantially symmetric about a centerline of the injection hole.

5. The seal pattern according to claim 1, wherein a sum of widths of the first and second openings is substantially equal to a sum of widths of the third, fourth, and fifth openings.

6. The seal pattern according to claim 1, wherein the injection hole further includes a plurality of injection hole dams.

7. The seal pattern according to claim 6, wherein the injection hole dams are spaced apart from each other.

* * * * *